United States Patent
Ku et al.

(10) Patent No.: US 12,258,064 B2
(45) Date of Patent: Mar. 25, 2025

(54) STEERING DEVICE OF VEHICLE

(71) Applicant: HL MANDO CORPORATION, Pyeongtaek-si (KR)

(72) Inventors: Sangchul Ku, Seoul (KR); Sunghun Park, Anyang-si (KR); Jeongrae Kim, Seoul (KR); Sungjune Moon, Seoul (KR); Taeho Kim, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/384,795

(22) Filed: Oct. 27, 2023

(65) Prior Publication Data

US 2024/0317298 A1    Sep. 26, 2024

(30) Foreign Application Priority Data

Mar. 24, 2023  (KR) .................. 10-2023-0038726

(51) Int. Cl.
  *B62D 1/189*    (2006.01)
  *B62D 1/181*    (2006.01)
  *B62D 1/19*     (2006.01)

(52) U.S. Cl.
  CPC ............. *B62D 1/189* (2013.01); *B62D 1/181* (2013.01); *B62D 1/192* (2013.01)

(58) Field of Classification Search
  CPC ......... B62D 1/189; B62D 1/181; B62D 1/192
  USPC ..................................................... 74/492, 493
  See application file for complete search history.

(56) References Cited

U.S. PATENT DOCUMENTS

| | | | |
|---|---|---|---|
| 8,910,976 B2* | 12/2014 | Toyoda ................. | B62D 1/181 280/775 |
| 9,321,476 B2* | 4/2016 | Morinaga ............. | B62D 1/181 |
| 10,479,394 B2* | 11/2019 | Kato .................... | B62D 5/0409 |
| 10,953,911 B2* | 3/2021 | Sekiguchi ............. | B62D 1/185 |
| 11,753,063 B2* | 9/2023 | Ku ......................... | B62D 1/187 74/493 |
| 2011/0215560 A1* | 9/2011 | Born ...................... | B62D 1/181 280/775 |
| 2013/0098193 A1* | 4/2013 | Morinaga ............. | B62D 1/181 74/493 |
| 2016/0114827 A1* | 4/2016 | Tanaka .................. | B62D 1/185 74/493 |
| 2023/0055548 A1* | 2/2023 | Ku ......................... | B62D 1/187 |

* cited by examiner

*Primary Examiner* — Toan C To
(74) *Attorney, Agent, or Firm* — Hauptman Ham, LLP

(57) ABSTRACT

According to the present embodiments, it is possible to quickly and stably store and withdraw the steering wheel to secure a space in the driver's seat, limit the contracting stroke of the steering column during collapsing motion to stably perform collapsing motion, and set various collapsing strokes.

19 Claims, 12 Drawing Sheets

(A)

(B)

STEERING DEVICE OF VEHICLE

CROSS-REFERENCE TO RELATED APPLICATION

This application claims priority from Korean Patent Application No. 10-2023-0038726, filed on Mar. 24, 2023, which is hereby incorporated by reference for all purposes as if fully set forth herein.

BACKGROUND

Field

The present embodiments relate to a vehicle steering device and, more specifically, to a vehicle steering device capable of quickly and stably storing and withdrawing the steering wheel to secure a space in the driver's seat, limiting the contracting stroke of the steering column during collapsing motion to stably perform collapsing motion, and setting various collapsing strokes.

Description of Related Art

A vehicle steering device is a device for changing the traveling direction of the vehicle as intended by the user and turns the left and right wheels of the vehicle to the left or right to allow the vehicle to travel in the direction desired by the driver.

The steering device includes a steering column for receiving the steering shaft connected with the steering wheel. Typically, the steering column has the telescoping and tilting functionality for adjusting the position of the steering wheel to fit the driver's height and body shape.

Recently, autonomous vehicles are advancing rapidly. Autonomous vehicles provide various features for enabling the driver to do various activities in autonomous driving mode. However, since the steering wheel takes up a lot of space in the driver's seat and interferes with the driver's movement, a steering column that may store the steering wheel in the vehicle body in autonomous driving mode and withdraw the steering wheel from the vehicle body in manual mode is being developed.

However, as the traveling distance of the steering wheel increases, the time required for storing and withdrawing the steering wheel increases and the rigidity decreases, so there is a need for a steering column that may quickly and stably store and withdraw the steering wheel.

Steering columns typically have an energy-absorbing structure that protects the driver in the event of an external impact, i.e., when the driver collides with the steering wheel, the steering column collapses and absorbs the load, reducing the impact on the driver. This is also true for autonomous vehicles, in which the steering column that may store the steering wheel is also equipped with an energy-absorbing structure. The energy-absorbing structure often includes a bending plate, which is plastically deformed during collapsing motion and absorbs the impact load.

However, if the bending plate deforms more than the stroke of the plastic deformation, the upper tube will be fully inserted into the lower tube, which may harm driver safety. In other words, the collapsing motion is stable within the stroke where the bending plate is plastically deformed, but after that, the axial support structure between the upper and lower tubes is released, so the collapsing motion is not stable.

Appropriate absorption load and collapsing stroke are required according to the characteristics of each vehicle type. The absorption load may be adjusted appropriately by changing the bending plate, but the collapsing stroke is difficult to adjust easily.

BRIEF SUMMARY

As devised in the foregoing background, the present embodiments may provide a vehicle steering device capable of quickly and stably storing and withdrawing the steering wheel to secure a space in the driver's seat, limiting the contracting stroke of the steering column during collapsing motion to stably perform collapsing motion, and setting various collapsing strokes.

According to the present embodiments, there may be provided a steering device of a vehicle, comprising an upper tube receiving a steering shaft, a lower tube receiving the upper tube, a first driver for sliding the upper tube with respect to the lower tube, a movable bracket to which the lower tube is coupled, a fixed bracket fixed to a vehicle body, opening to two axially opposite sides, and including a receiving part receiving the movable bracket and a pair of plate parts supported on two widthwise opposite side surfaces of the movable bracket, and a second driver for sliding the movable bracket with respect to the fixed bracket.

Further, according to the present embodiments, there may be provided a steering device of a vehicle, comprising an upper tube receiving a steering shaft, a lower tube receiving the upper tube, a first driver for sliding the upper tube with respect to the lower tube, a movable bracket to which the lower tube is coupled, a fixed bracket fixed to a vehicle body and to which the movable bracket is axially slidably coupled, a second driver for sliding the movable bracket with respect to the fixed bracket, a bending plate having one end coupled to the lower tube and absorbing a load when the upper tube collapses with respect to the lower tube, and a stopper provided on an outer surface of the upper tube and axially overlapping one end of the bending plate.

According to the present embodiments, it is possible to quickly and stably store and withdraw the steering wheel to secure a space in the driver's seat, limit the contracting stroke of the steering column during collapsing motion to stably perform collapsing motion, and set various collapsing strokes.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
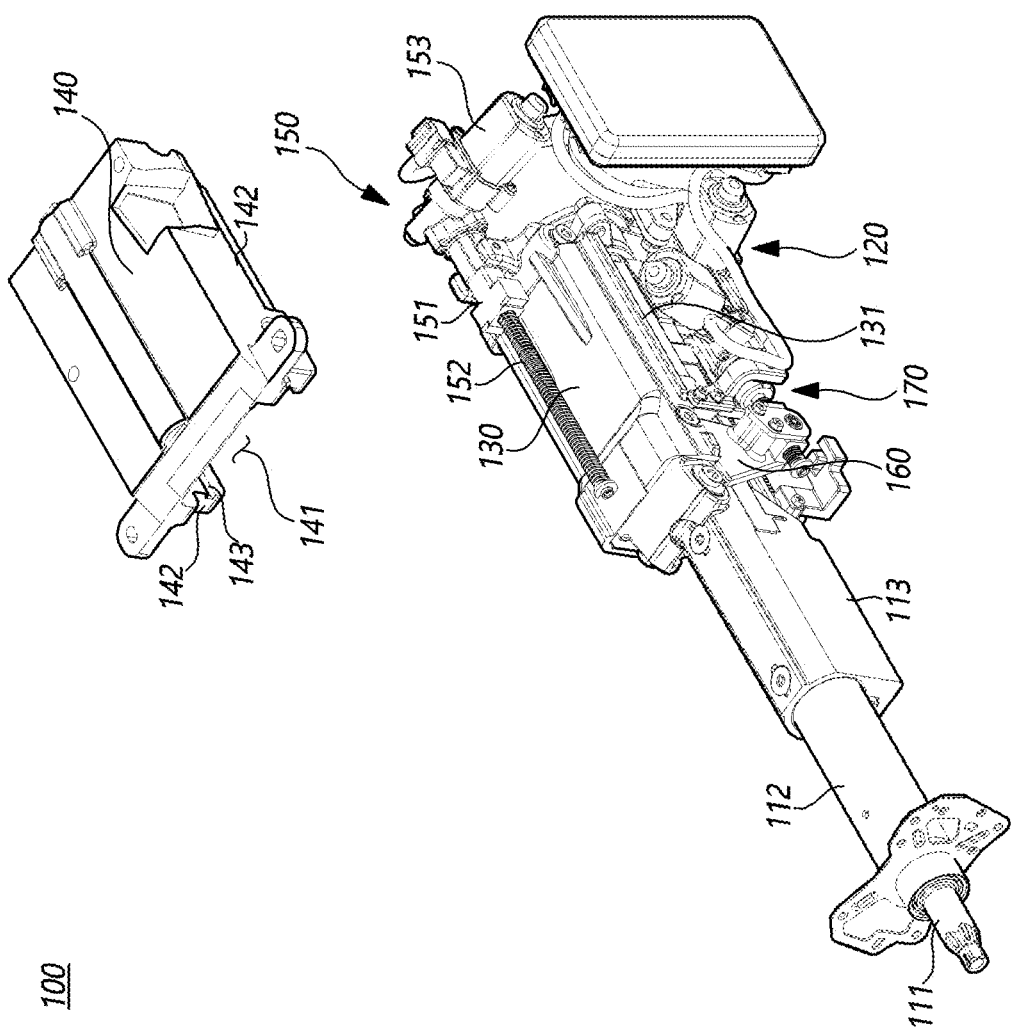
FIG. 1 is an exploded perspective view illustrating a steering column for a vehicle according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
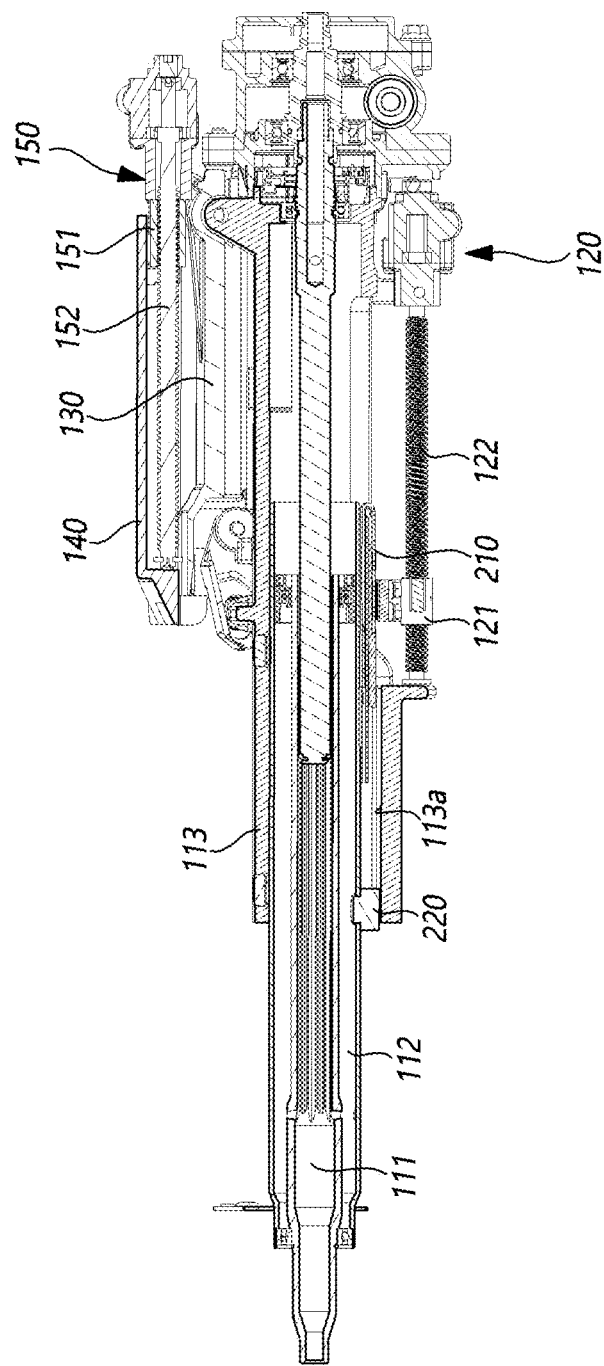
FIG. 2 is a cross-sectional view illustrating a steering device of a vehicle according to the present embodiments.
Figure 3:
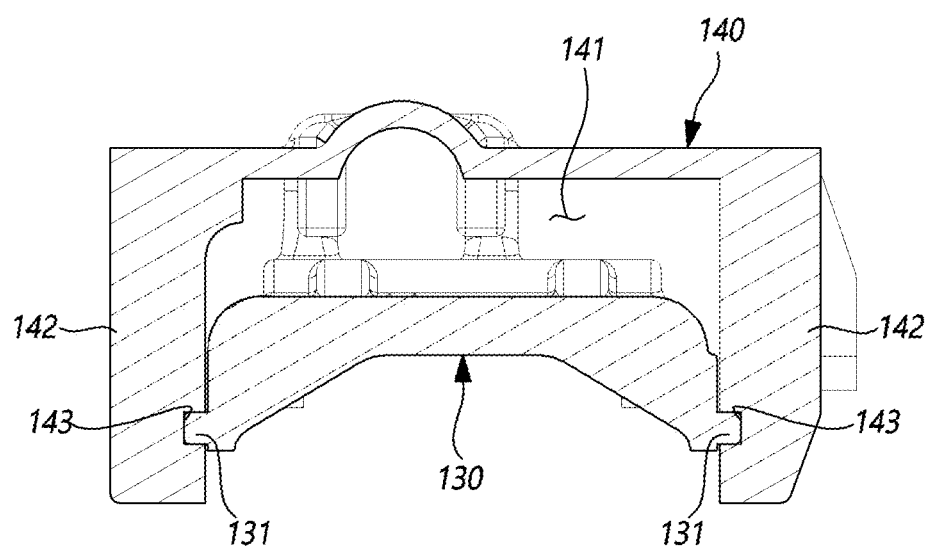
FIG. 3 is a cross-sectional view illustrating a portion of a steering device of a vehicle according to the present embodiments.
Figure 4:
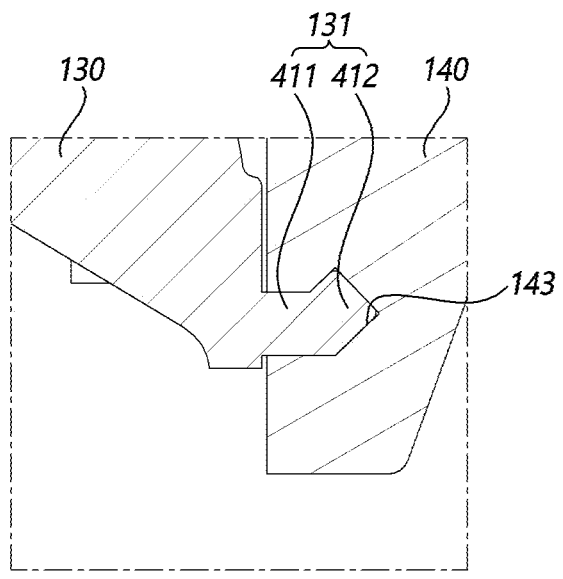
FIG. 4 is a cross-sectional view illustrating a portion of a steering device of a vehicle according to the present embodiments.
Figure 4:
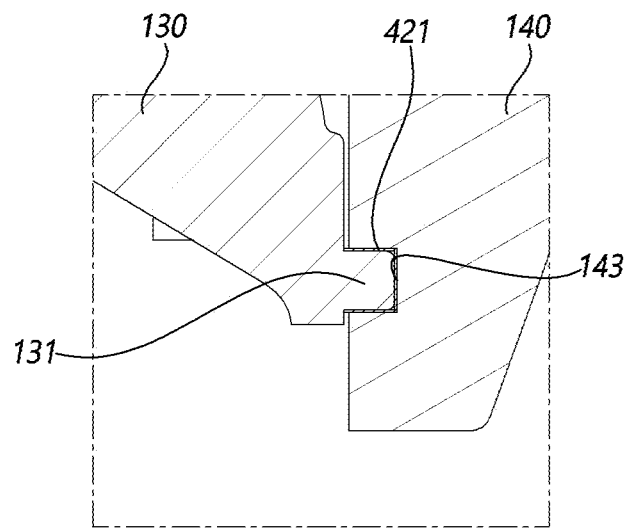
Figure 5:
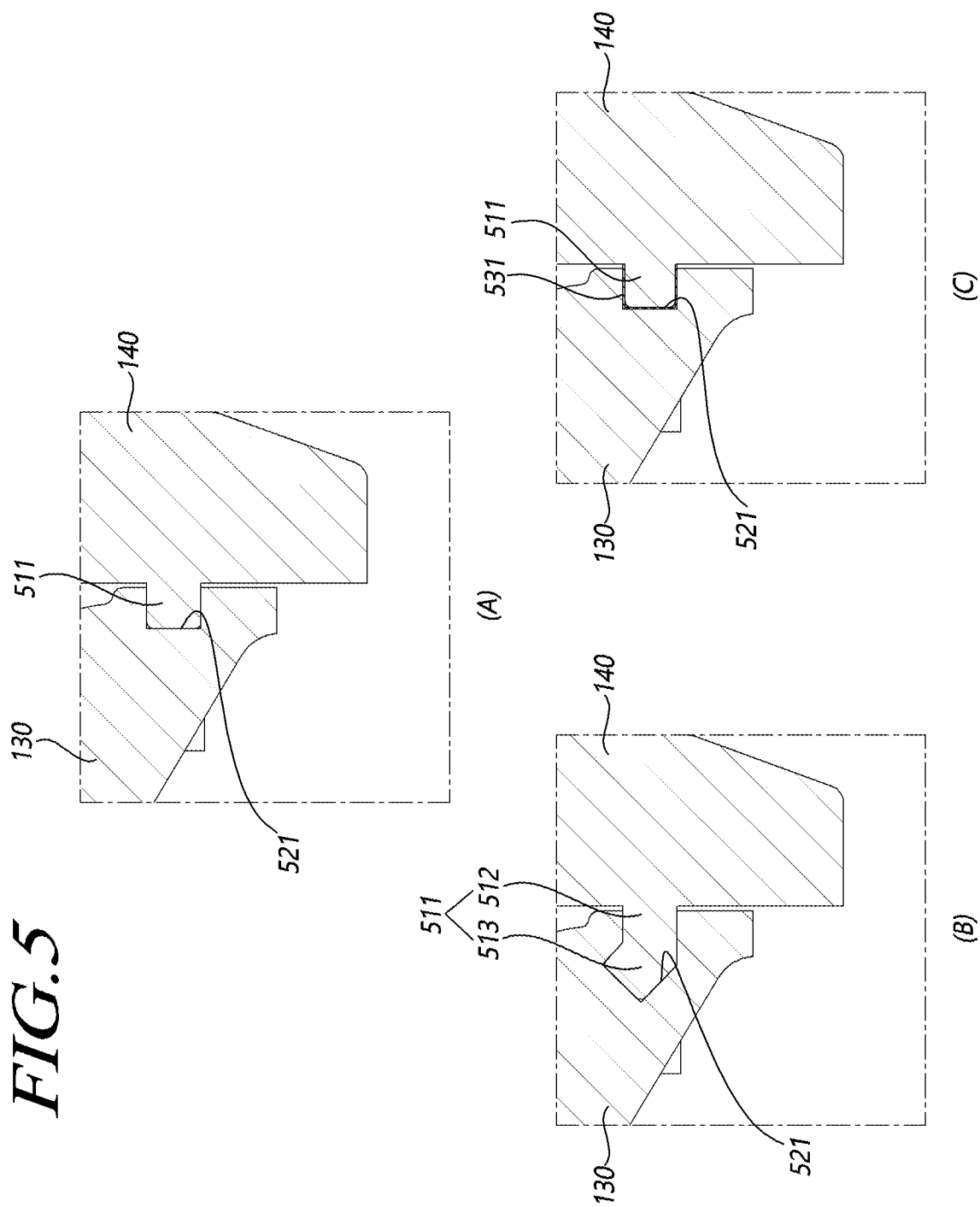
FIG. 5 is a cross-sectional view illustrating a portion of a steering device of a vehicle according to the present embodiments.
Figure 6:
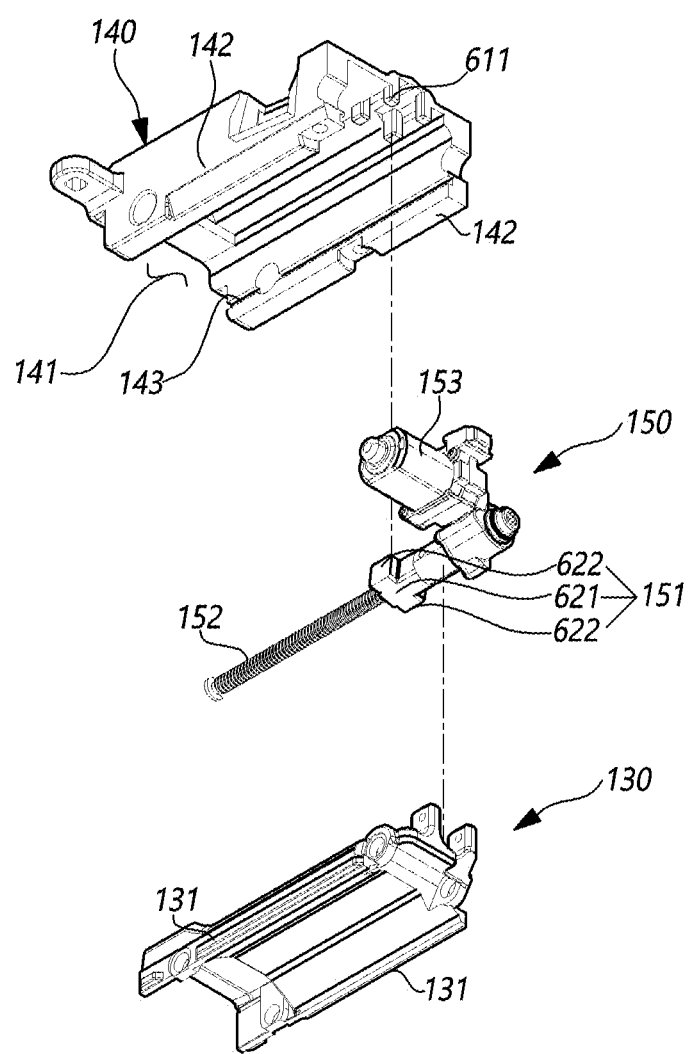
FIG. 6 is an exploded perspective view illustrating a portion of a steering device of a vehicle according to the present embodiments.
Figure 7:
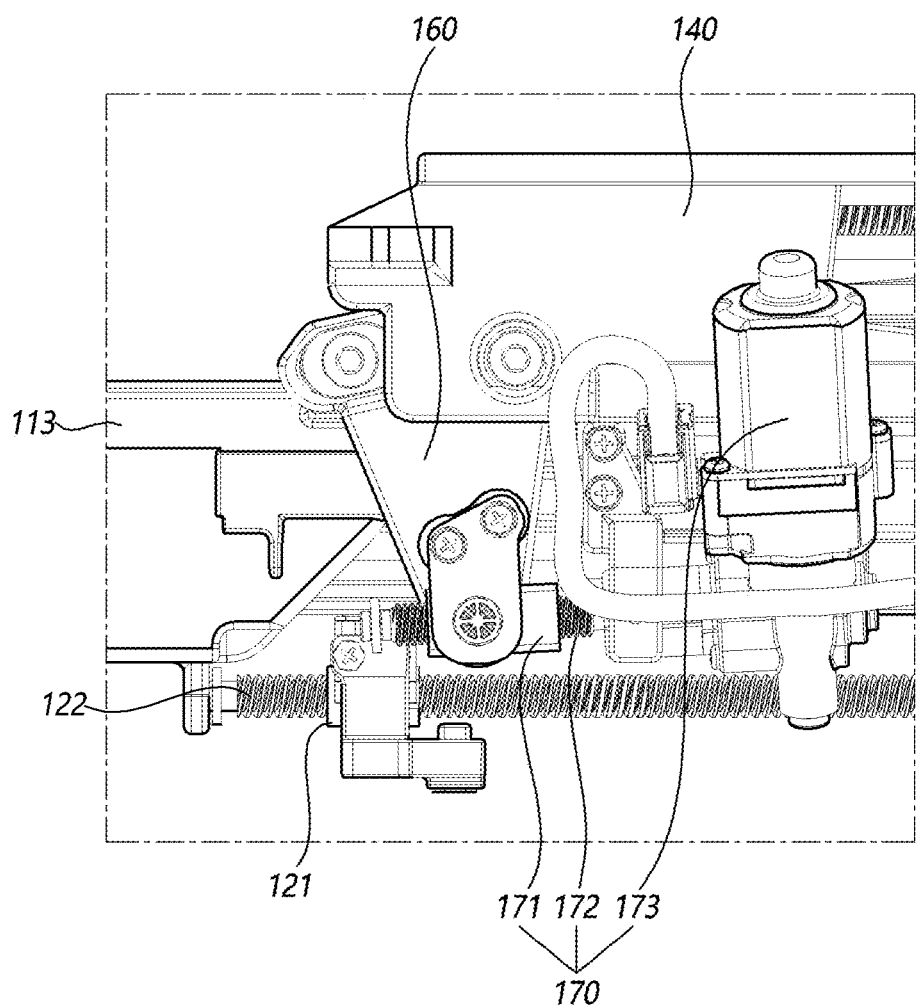
FIG. 7 is a side view illustrating a portion of a steering device of a vehicle according to the present embodiments.
Figure 8:
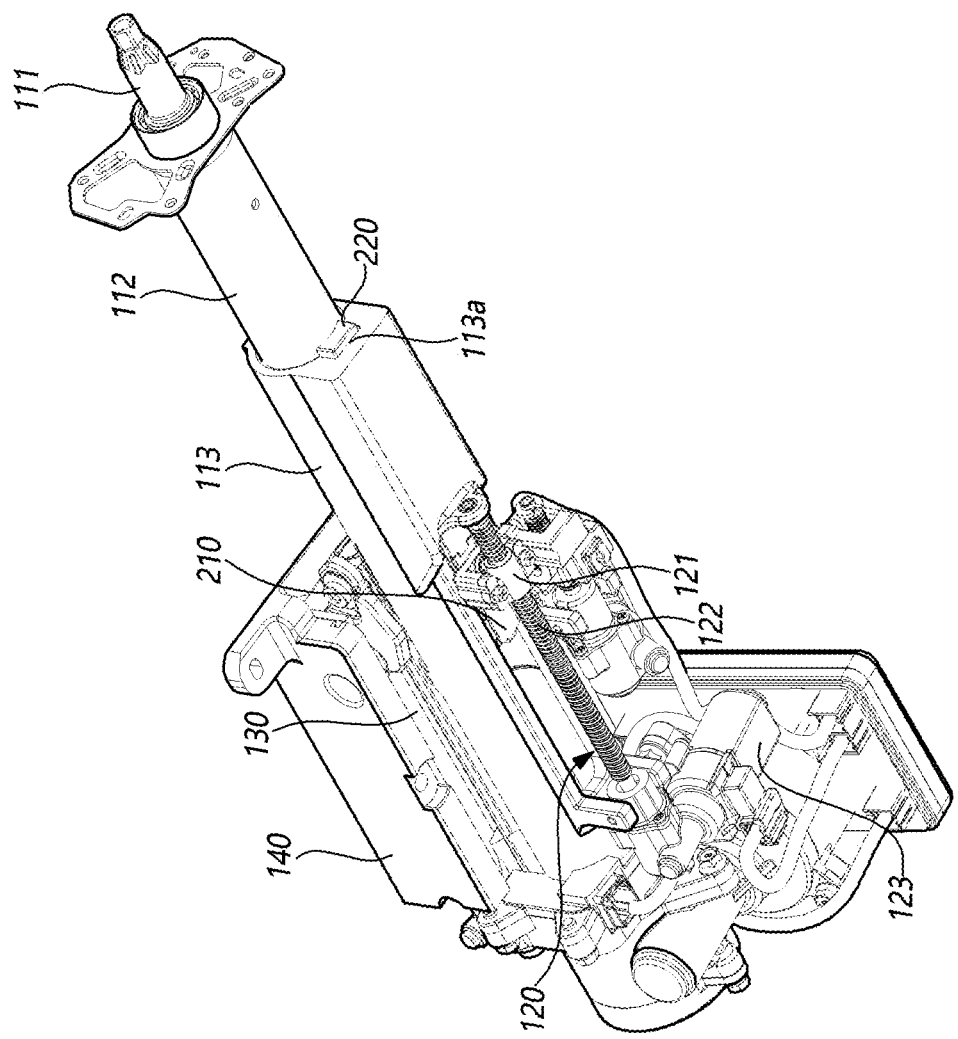
FIG. 8 is a perspective view illustrating a steering device of a vehicle according to the present embodiments.
Figure 9:
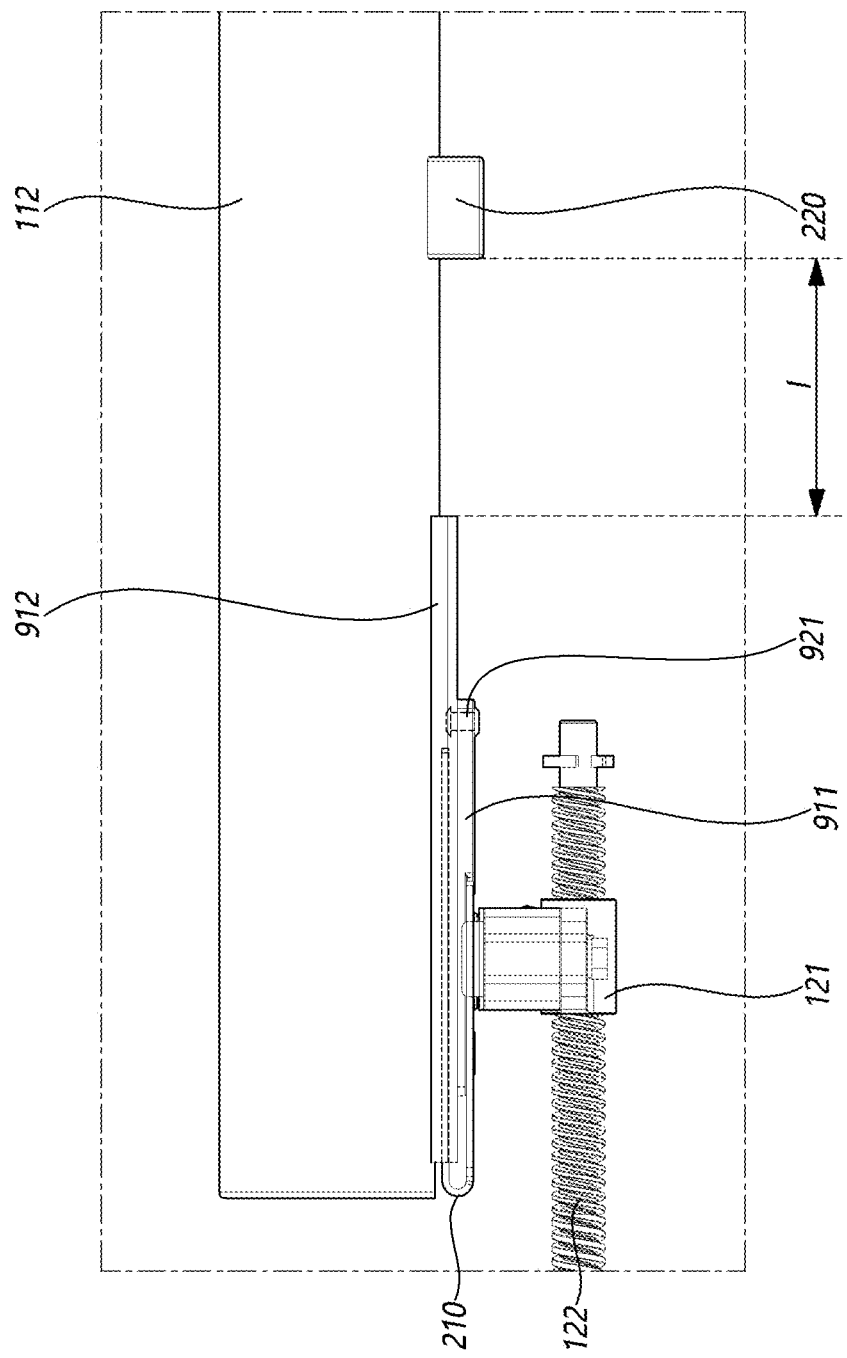
FIG. 9 is a side view illustrating a portion of a steering device of a vehicle according to the present embodiments.
Figure 10:
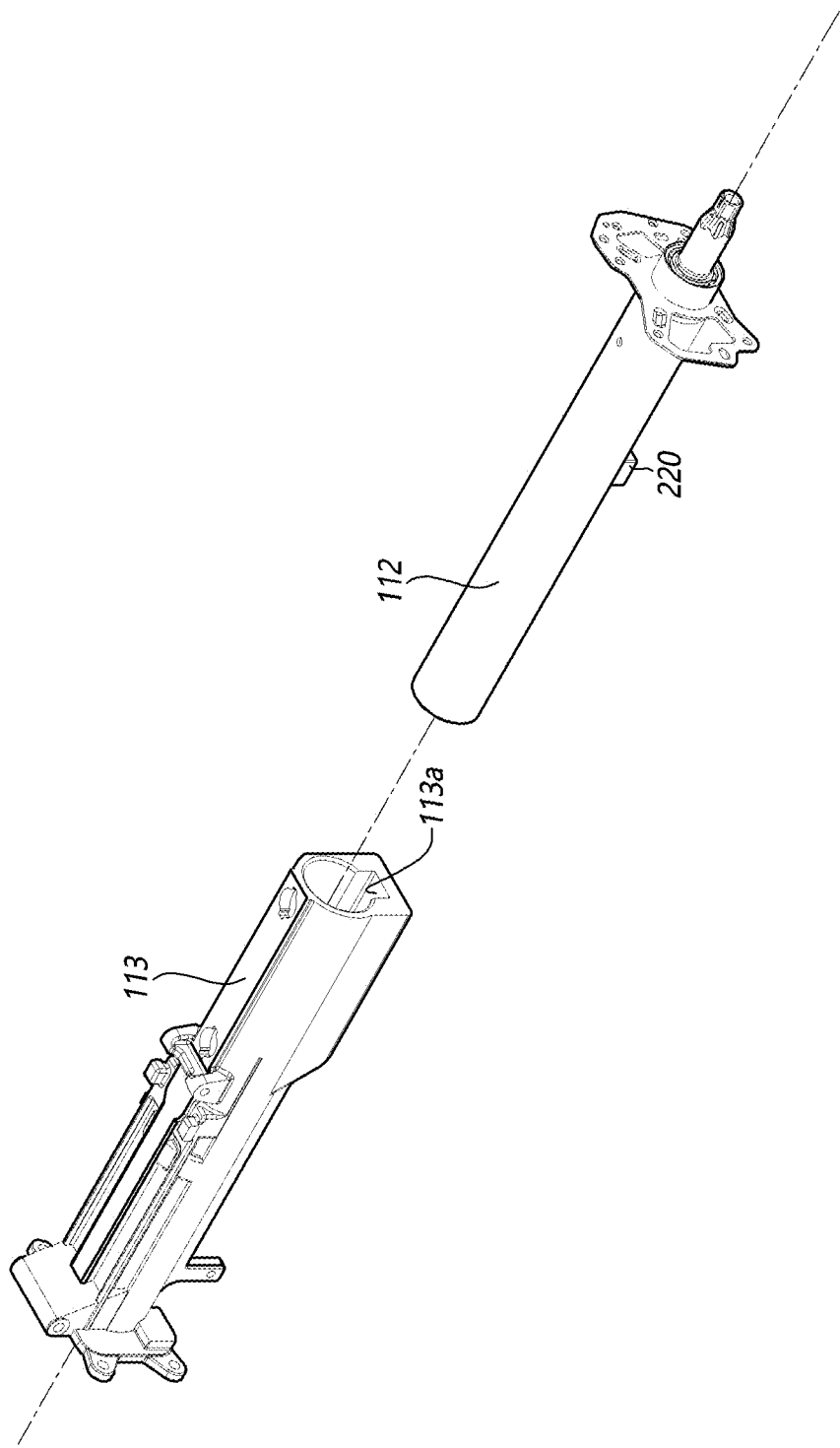
FIG. 10 is an exploded perspective view illustrating a portion of a steering device of a vehicle according to the present embodiments.
Figure 11:
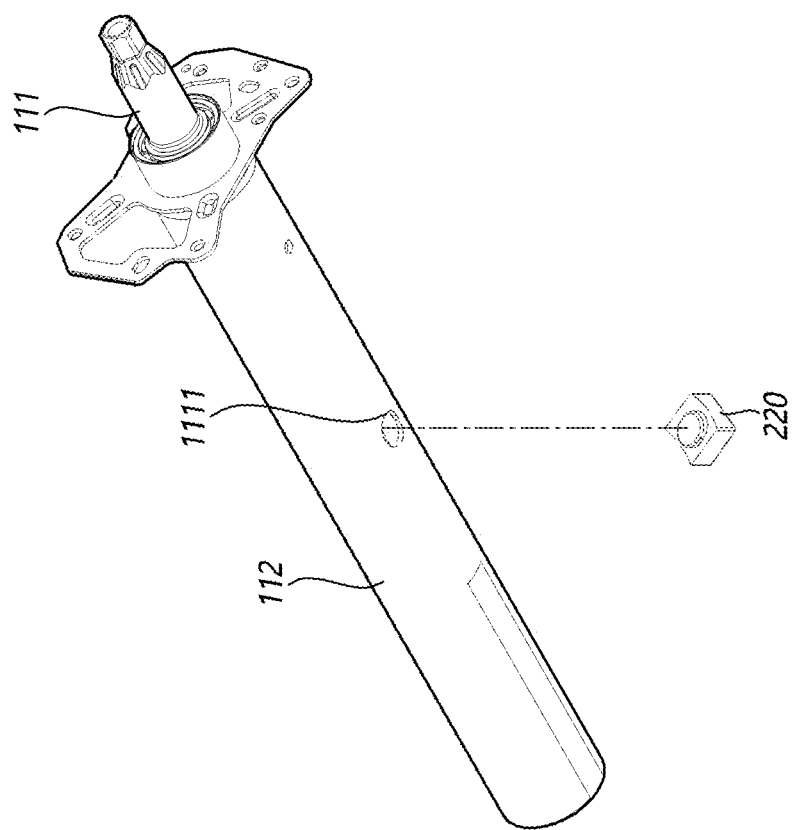
FIG. 11 is an exploded perspective view illustrating a portion of a steering device of a vehicle according to the present embodiments.
Figure 12:
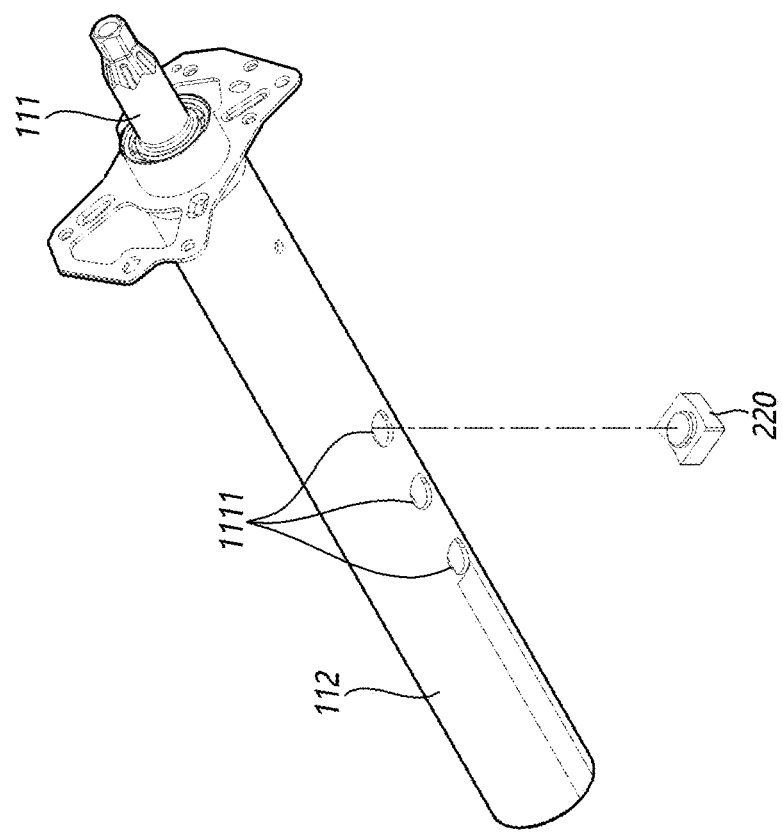
FIG. 12 is an exploded perspective view illustrating a portion of a steering device of a vehicle according to the present embodiments.

FIG. 1 is an exploded perspective view illustrating a steering column for a vehicle according to the present embodiments. FIG. 2 is a cross-sectional view illustrating a steering device of a vehicle according to the present embodiments. FIG. 3 is a cross-sectional view illustrating a portion of a steering device of a vehicle according to the present embodiments. FIG. 4 is a cross-sectional view illustrating a portion of a steering device of a vehicle according to the present embodiments. FIG. 5 is a cross-sectional view illustrating a portion of a steering device of a vehicle according to the present embodiments. FIG. 6 is an exploded perspective view illustrating a portion of a steering device of a vehicle according to the present embodiments. FIG. 7 is a side view illustrating a portion of a steering device of a vehicle according to the present embodiments. FIG. 8 is a perspective view illustrating a steering device of a vehicle according to the present embodiments. FIG. 9 is a side view illustrating a portion of a steering device of a vehicle according to the present embodiments. FIG. 10 is an exploded perspective view illustrating a portion of a steering device of a vehicle according to the present embodiments. FIG. 11 is an exploded perspective view illustrating a portion of a steering device of a vehicle according to the present embodiments. FIG. 12 is an exploded perspective view illustrating a portion of a steering device of a vehicle according to the present embodiments.

A steering device 100 of a vehicle according to the present embodiments includes an upper tube 112 receiving a steering shaft 111, a lower tube 113 receiving the upper tube 112, a first driver 120 for sliding the upper tube 112 with respect to the lower tube 113, a movable bracket 130 to which the lower tube 113 is coupled, a fixed bracket 140 fixed to a vehicle body, opening to two axially opposite sides, and including a receiving part 141 receiving the movable bracket 130 and a pair of plate parts 142 supported on two widthwise opposite side surfaces of the movable bracket 130, and a second driver 150 for sliding the movable bracket 130 with respect to the fixed bracket 140.

Referring to FIGS. 1 and 2, a steering device 100 of a vehicle according to the present embodiments includes an upper tube 112, a lower tube 113, a first driver 120, a movable bracket 130, a fixed bracket 140, and a second driver 150.

The upper tube 112 receives the steering shaft 111 and is inserted into the lower tube 113 to be axially slidable with respect to the lower tube 113. The first driver 120 is coupled to the upper tube 112 and the lower tube 113. As the first driver 120 slides the upper tube 112 with respect to the lower tube 113, a telescoping motion of the steering column is performed. The first driver 120 includes a nut 121, a screw 122, and a motor 123.

The lower tube 113 is coupled to the movable bracket 130 and is fixed to the movable bracket 130 in the axial direction. One end of the lower tube 113 is hinged to the movable bracket 130, and a middle end of the lower tube 113 is coupled to the movable bracket 130 through the tilt bracket 160. As the third driver 170 rotates the tilt bracket 160, a tilting motion of the steering column is performed. The third driver 170 includes a nut 171, a screw 172, and a motor 173.

The movable bracket 130 is coupled to the fixed bracket 140, and the fixed bracket 140 is fixed to the vehicle body. In other words, the steering column is coupled to the vehicle body through the fixed bracket 140. The movable bracket 130 is coupled to the fixed bracket 140 so as to be slidable in the axial direction. In other words, as the movable bracket 130 slides in the axial direction with respect to the fixed bracket 140, the entire steering column is moved in the axial direction. The second driver 150 moves the movable bracket 130 with respect to the fixed bracket 140, and accordingly, the steering column is moved in the axial direction. The second driver 150 includes a nut 151, a screw 152, and a motor 153.

The operation of storing and withdrawing the steering wheel may be performed by simultaneously moving the movable bracket 130 with respect to the fixed bracket 140 by the second driver 150 and moving the upper tube 112 with respect to the lower tube 113 by the first driver 120. In other words, since the steering wheel moves according to the movement generated by the first driver 120 and the second driver 150, the storing and withdrawing operation may be quickly performed.

The fixed bracket 140 includes a receiving part 141 and a plate part 142. The movable bracket 130 is received in the receiving part 141, and the receiving part 141 is opened to two opposite sides in the axial direction so that the movable bracket 130 may move in the axial direction. A pair of plate parts 142 are provided to be supported on two opposite side surfaces of the movable bracket 130 in the width direction, and the movable bracket 130 is coupled to be slidable in the axial direction. As the plate parts 142 are supported on two opposite side surfaces of the movable bracket 130 in the width direction and guide the axial movement of the movable bracket 130, the operation of storing and withdrawing the steering wheel may be stably performed.

As is described below in detail, guide structures are provided on two opposite side surfaces of the movable bracket 130 in the width direction and on the inner surface of the plate part 142 so that the movable bracket 130 may slide in the axial direction with respect to the fixed bracket 140. With this guide structure, the steering column may be stably moved in the axial direction.

Referring to FIG. 3, according to an embodiment, rail grooves 143 may be formed in the inner surfaces of the plate parts 142 along the axial direction, and guide protrusions 131 inserted into the rail grooves 143 may be formed on two opposite side surfaces of the movable bracket 130 in the width direction. Like the receiving part 141, the rail groove 143 may be opened in the axial direction. The guide protrusion 131 is inserted into the rail groove 143, and the movable bracket 130 is coupled to the fixed bracket 140.

The rail groove 143 may be formed from one end to the other end of the plate 142 in the axial direction, and the guide protrusion 131 may be formed from one end to the other end of the movable bracket 130 in the axial direction. In other words, when the movable bracket 130 slides, the movable bracket 130 has a large contact area with the fixed bracket 140, and thus the stability of the operation of storing and withdrawing the steering wheel is enhanced.

Referring to FIG. 4(A), according to an embodiment, the guide protrusion 131 may include a protrusion 411 protruding from two opposite side surfaces of the movable bracket 130 in the width direction and a bend 412 at an end of the protrusion 411. The rail groove 143 is formed in a shape corresponding to the shapes of the protrusion 411 and the bend 412. The protrusion 411 may protrude in a direction perpendicular to two widthwise opposite side surfaces of the movable bracket 130. The bend 412 may be bent and extended from an end of the protrusion 411 in a direction inclined with respect to the protrusion 411. The bend 412 is shown as bent upward in the drawings, but may be bent downward.

As the guide protrusion 131 includes the protrusion 411 and the bend 412, each guide protrusion 131 is supported in two opposite width directions (the left and right directions of FIG. 4) on the fixed bracket 140 while being inserted into the rail groove 143. Accordingly, the stability of the axial movement of the movable bracket 130 may be further enhanced.

Referring to FIG. 4(B), according to an embodiment, a bushing 421 provided between the guide protrusion 131 and the rail groove 143 may be further included. The bushing 421 is seated on the inner surface of the rail groove 143 and is supported on the outer surface of the guide protrusion 131 inserted into the rail groove 143. The bushing 421 is formed of a low friction material to reduce friction between the guide protrusion 131 and the rail groove 143 when the movable bracket 130 slides in the axial direction. Accordingly, the stability of the axial movement of the movable bracket 130 may be further enhanced. Although omitted in the drawings, the bushing 421 may be provided to be supported on the outer surfaces of the protrusion 411 and the bend 412.

Referring to FIG. 5(A), according to an embodiment, rail grooves 521 may be formed in two widthwise opposite side surfaces of the movable bracket 130 along the axial direction, and guide protrusions 511 inserted into the rail grooves 521 may be formed on the inner side surface of the plate part 142. Like the receiving part 141, the rail groove 521 may be opened in the axial direction. The guide protrusion 511 is inserted into the rail groove 521, and the movable bracket 130 is coupled to the fixed bracket 140.

The rail groove 521 may be formed from one end to the other end of the movable bracket 130 in the axial direction, and the guide protrusion 511 may be formed from one end to the other end of the plate 142 in the axial direction. In other words, the movable bracket 130 has a wide contact area with the fixed bracket 140 and slides. Accordingly, the stability of the storing and withdrawing operation of the steering wheel is enhanced.

Referring to FIG. 5(B), according to an embodiment, the guide protrusion 511 may include a protrusion 512 protruding from an inner surface of the plate 142 and a bend 153 at an end of the protrusion 512. The rail groove 521 is formed in a shape corresponding to the shapes of the protrusion 512 and the bend 513. The protrusion 512 may protrude in a direction perpendicular to the inner surface of the plate 142, and the bend 513 may be bent and extended from an end of the protrusion 512 in a direction inclined with respect to the protrusion 512. The bend 513 is shown as bent upward in the drawings, but may be bent downward.

As the guide protrusion 511 includes the protrusion 512 and the bend 513, each guide protrusion 511 is supported on the movable bracket 130 in two opposite width directions (the left/right direction based on FIG. 5(B)) while being inserted into the rail groove 521. Accordingly, the stability of the axial movement of the movable bracket 130 may be further enhanced.

Referring to FIG. 5(C), according to an embodiment, a bushing 531 provided between the guide protrusion 511 and the rail groove 521 may be further included. The bushing 531 is seated on the inner surface of the rail groove 521 and is supported on the outer surface of the guide protrusion 511 inserted into the rail groove 521. The bushing 531 is formed of a low friction material to reduce friction between the guide protrusion 511 and the rail groove 521 when the movable bracket 130 slides in the axial direction. Accordingly, the stability of the axial movement of the movable bracket 130 may be further enhanced. Although omitted in the drawings, the bushing 531 may be provided to be supported on the outer surfaces of the protrusion 512 and the bend 513.

Referring to FIG. 6, according to an embodiment, the second driver 150 may include a nut 151 coupled to the fixed bracket 140, a screw 152 engaged with the nut 151, and a motor 153 coupled to the movable bracket 130 to rotate the screw 152. The second driver 150 may further include a reducer connecting the screw 152 and the motor 153, and a housing receiving the reducer and coupled to the motor 153 may be coupled to the movable bracket 130. The reducer connecting the screw 152 and the motor 153 may be, e.g., a reducer including a worm shaft-worm wheel.

In other words, as the motor 153 rotates the screw 152, the nut 151 is moved axially with respect to the screw 152. However, since the nut 151 is coupled to the fixed bracket 140 and fixed in the axial direction, the steering column is moved in the axial direction with respect to the nut 151 as the motor 153 rotates the screw 152.

According to an embodiment, the nut 151 may include a body part 621 engaged with the screw 152 and protrusions 622 protruding from two opposite side surfaces of the body part 621 in the width direction, and the fixed bracket 140 may include support parts 611 supported by the protrusions 622 on two axially opposite sides. In other words, as illustrated in the drawings, four support parts 611 may be provided to be supported in the front and rear directions of two opposite protrusions 622, respectively, so that the nut 151 may be fixed to the fixed bracket 140 in the axial direction.

Referring to FIGS. 1 and 7, according to an embodiment, the steering device 100 of the vehicle according to the present embodiments may further include a tilt bracket 160 rotatably coupled to each of the fixed bracket 140 and the movable bracket 130 and a third driver 170 for rotating the tilt bracket 160.

One end of the movable bracket 130 may be hinged to one end of the lower tube 113, and the other end of the movable bracket 130 may be coupled to a middle end of the lower tube 113 through the tilt bracket 160. Accordingly, if the tilt bracket 160 is rotated by the third driver 170, the lower tube 113 is tilted about one end hinged to the movable bracket 130.

According to an embodiment, the third driver 170 may include a nut 171 coupled to the tilt bracket 160, a screw 172 engaged with the nut 171, and a motor 173 coupled to the lower tube 113 to rotate the screw 172.

The nut 171 and the motor 173 are rotatably coupled to the tilt bracket 160 and the lower tube 113, respectively, so that the steering column may be tilted by rotation of the tilt bracket 160. A reducer connecting the screw 172 and the motor 173 may be further included, and a housing receiving the reducer may be rotatably coupled to the lower tube 113.

A steering device 100 of a vehicle according to the present embodiments includes an upper tube 112 receiving a steering shaft 111, a lower tube 113 receiving the upper tube 112, a first driver 120 for sliding the upper tube 112 with respect to the lower tube 113, a movable bracket 130 to which the lower tube 113 is coupled, a fixed bracket 140 fixed to a vehicle body and to which the movable bracket 130 is axially slidably coupled, a second driver for sliding the movable bracket 130 with respect to the fixed bracket 140, a bending plate 210 having one end coupled to the lower tube 113 and absorbing a load when the upper tube 112 collapses with respect to the lower tube 113, and a stopper provided on an outer surface of the upper tube 112 and axially overlapping one end of the bending plate 210. The same features as those of the above-described embodiments will be briefly described, and the description focuses primarily on differences.

Referring to FIGS. 2, 8, and 9, the upper tube 112 receiving the steering shaft 111 is slid with respect to the lower tube 113 by the first driver 120, and the movable bracket 130 to which the lower tube 113 is coupled is slid with respect to the fixed bracket 140 fixed to the vehicle body by the second driver 150. The movable bracket 130 and the fixed bracket 140 are coupled by the rail groove and the guide protrusion to enhance stability in storing and withdrawing the steering wheel.

When the driver collides with the steering wheel due to an external impact or the like, a collapsing motion in which the upper tube 112 is inserted into the lower tube 113 is performed. In the process of performing the collapsing motion, the bending plate 210 is plastically deformed to absorb the load to reduce the impact applied to the driver. One end of the bending plate 210 is coupled to the lower tube 113, and the upper tube 112 is axially supported by the bending plate 210 in the collapsing motion. The bending plate 210 is plastically deformed by the axial movement of the upper tube 112 and absorbs the load.

One end of the bending plate 210 is coupled to the lower tube 113, and in the telescoping motion, is axially moved along with the upper tube 112. However, one end of the bending plate 210 is fixed to the lower tube 113 without moving in the axial direction in the collapsing motion.

The stopper 220 is provided to overlap one end of the bending plate 210 in the axial direction on the outer surface of the upper tube 112. In other words, the stopper 220 overlaps one end of the bending plate 210 in the axial direction and is provided to be spaced apart by a predetermined distance. In the telescoping motion, since one end of the bending plate 210 moves together with the upper tube 112, the distance between the stopper 220 and the bending plate 210 is maintained. However, in the collapsing motion, since one end of the bending plate 210 is fixed in the axial direction, the distance between the stopper 220 and the bending plate 210 is reduced as the collapsing motion proceeds, and the stopper 220 is supported in the axial direction on the bending plate 210 and the collapsing stroke is limited. During the collapsing motion, the stopper 220 may be directly supported on one end of the bending plate 210, but may be supported on the first bracket 911 coupled to one end of the bending plate 210 and may be indirectly supported on one end of the bending plate 210.

As the stopper 220 is supported on one end of the bending plate 210 to limit the collapsing stroke, it is possible to structurally prevent the stopper 220 from collapsing deeper than the plastic deformation area of the bending plate 210. Therefore, since load absorption due to plastic deformation of the bending plate 210 is continuously provided from the start to the end of the collapsing motion, the collapsing motion may be stably performed.

According to an embodiment, the first driver 120 may include a nut 121 coupled to one end of the bending plate 210, a screw 122 engaged with the nut 121, and a motor 123 coupled to the lower tube 113 to rotate the screw 122. The first driver 120 may further include a reducer connecting the screw 122 and the motor 123, and a housing receiving the reducer may be coupled to the lower tube 113.

The screw 122 is rotated by the driving force of the motor 123, and the nut 121 moves in the axial direction, and the upper tube 112 moves together with the axial movement of the nut 121. According to an embodiment, the first bracket 911 coupled to the nut 121 may be coupled to one end of the bending plate 210, and the second bracket 912 coupled to the first bracket 911 may be coupled through a front end member in the upper tube 112.

The nut 121 may be coupled to one end of the bending plate 210 and the first bracket 911 together by bolting. The front end member 921 couples the first bracket 911 and the second bracket 912. In the telescoping motion, the driving force of the first driver 120 is transferred to the upper tube 112 through the front end member 921. The collapsing motion is performed when the front end member 921 is broken by an external impact.

The other end of the bending plate 210 may be bent from one end and inserted between the second bracket 912 and the upper tube 112. Accordingly, when the collapsing motion starts, the second bracket 912 is supported on the bend of the bending plate 210, and the bending plate 210 is plastically deformed.

Referring to FIGS. 2 and 10, according to an embodiment, guide grooves 113a may be formed in the lower tube 113 to be opened to two opposite sides in the axial direction to receive the stopper 220. The stopper 220 is provided on the outer circumferential surface of the upper tube 112 and is moved along the guide groove 113a of the lower tube 113 during the telescoping motion or the collapsing motion. As the stopper 220 is inserted into the guide groove 113a, when the stopper 220 is axially supported by one end (or the first bracket 911) of the bending plate 210 and the collapsing stroke is limited, the stopper 220 may be prevented from being separated from the upper tube 112, and thus the collapsing motion may be stably terminated.

Referring to FIG. 11, according to an embodiment, a coupling hole 1111 to which the stopper 220 is coupled may be formed in the upper tube 112. A protrusion inserted into the coupling hole 1111 may be formed in the stopper 220, and the protrusion may be inserted into the coupling hole 1111 and the stopper 220 may be press-fitted.

Referring to FIG. 12, according to an embodiment, the upper tube 112 may be provided with a plurality of coupling parts to which the stopper 220 may be coupled, spaced apart from each other in the axial direction. The drawings illustrate an embodiment in which three coupling holes 1111 are provided while being spaced apart in the axial direction. In other words, the position of the stopper 220 may be adjusted on the outer circumferential surface of the upper tube 112, and accordingly, the distance between the stopper 220 and one end (or the first bracket 911) of the bending plate 210 is changed. Therefore, the maximum collapsing stroke may be easily adjusted in the assembling step.

By the so-shaped vehicle steering device, it is possible to quickly and stably store and withdraw the steering wheel to secure a space in the driver's seat, limit the contracting stroke of the steering column during collapse motion to stably perform collapse motion, and set various collapse strokes.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A steering device of a vehicle, comprising:
   an upper tube receiving a steering shaft;
   a lower tube receiving the upper tube;
   a first driver for sliding the upper tube with respect to the lower tube;
   a movable bracket to which the lower tube is coupled;
   a fixed bracket fixed to a vehicle body, opening to two axially opposite sides, and including a receiving part receiving the movable bracket and a pair of plate parts supported on two widthwise opposite side surfaces of the movable bracket; and
   a second driver for sliding the movable bracket with respect to the fixed bracket,
   wherein a rail groove is formed in an inner surface of the pair of plate parts along an axial direction, and
   wherein a guide protrusion inserted into the rail groove is formed on the two widthwise opposite side surfaces of the movable bracket.

2. The steering device of claim 1, wherein the guide protrusion includes protrusions protruding from the two widthwise opposite side surfaces of the movable bracket and bends at ends of the protrusions.

3. The steering device of claim 1, further comprising a bushing provided between the guide protrusion and the rail groove.

4. The steering device of claim 1, wherein the second driver includes a nut coupled to the fixed bracket, a screw engaged with the nut, and a motor coupled to the movable bracket to rotate the screw.

5. The steering device of claim 4, wherein the second driver further includes a reducer connecting the screw and the motor.

6. The steering device of claim 4, wherein the nut includes a body part engaged with the screw, and protrusions protruding from two widthwise opposite side surfaces of the body part, and wherein the fixed bracket includes supports supported by the protrusions on the two axially opposite sides.

7. The steering device of claim 1, further comprising
   a tilt bracket rotatably coupled to each of the fixed bracket and the movable bracket; and
   a third driver for rotating the tilt bracket.

8. The steering device of claim 7, wherein the third driver includes a nut coupled to the tilt bracket, a screw engaged with the nut, and a motor coupled to the lower tube to rotate the screw.

9. A steering device of a vehicle, comprising:
   an upper tube receiving a steering shaft;
   a lower tube receiving the upper tube;
   a first driver for sliding the upper tube with respect to the lower tube;
   a movable bracket to which the lower tube is coupled;
   a fixed bracket fixed to a vehicle body, opening to two axially opposite sides, and including a receiving part receiving the movable bracket and a pair of plate parts supported on two widthwise opposite side surfaces of the movable bracket; and a second driver for sliding the movable bracket with respect to the fixed bracket, wherein a rail groove is formed in the two widthwise opposite side surfaces along an axial direction, and wherein a guide protrusion inserted into the rail groove is formed on an inner surface of the pair of plate parts.

10. The steering device of claim 9, wherein the guide protrusion includes a protrusion protruding from the inner surface of the pair of plate parts and a bend at an end of the protrusion.

11. The steering device of claim 9, further comprising a bushing provided between the guide protrusion and the rail groove.

12. A steering device of a vehicle, comprising:
an upper tube receiving a steering shaft;
a lower tube receiving the upper tube;
a first driver for sliding the upper tube with respect to the lower tube;
a movable bracket to which the lower tube is coupled;
a fixed bracket fixed to a vehicle body and to which the movable bracket is axially slidably coupled;
a second driver for sliding the movable bracket with respect to the fixed bracket;
a bending plate having one end coupled to the lower tube and absorbing a load when the upper tube collapses with respect to the lower tube; and
a stopper provided on an outer surface of the upper tube and axially overlapping one end of the bending plate.

13. The steering device of claim 12, wherein the first driver includes a nut coupled to the one end of the bending plate, a screw engaged with the nut, and a motor coupled to the lower tube to rotate the screw.

14. The steering device of claim 13, wherein the first driver further includes a reducer connecting the screw and the motor.

15. The steering device of claim 13, wherein a first bracket coupled to the nut is coupled to the one end of the bending plate, and wherein a second bracket coupled to the first bracket is coupled through a front end member in the upper tube.

16. The steering device of claim 15, wherein another end of the bending plate is bent from the one end and inserted between the second bracket and the upper tube.

17. The steering device of claim 12, wherein the lower tube has a guide groove opened to two axially opposite sides to receive the stopper.

18. The steering device of claim 12, wherein the upper tube has a coupling hole into which the stopper is press-fitted.

19. The steering device of claim 12, wherein the upper tube includes a plurality of coupling parts to which the stopper is configured to be coupled and which are axially spaced apart from each other.

* * * * *